United States Patent [19]

Tanaka

[11] Patent Number: 4,663,702
[45] Date of Patent: May 5, 1987

[54] POWER CONVERTER APPARATUS AND CONTROL METHOD THEREOF

[75] Inventor: Shigeru Tanaka, Tokyo, Japan

[73] Assignee: Kabushiki Kaisha Toshiba, Kawasaki, Japan

[21] Appl. No.: 784,994

[22] Filed: Oct. 7, 1985

[30] Foreign Application Priority Data

Oct. 12, 1984 [JP] Japan ................................ 59-212559
Jun. 13, 1985 [JP] Japan ................................ 60-127137

[51] Int. Cl.⁴ ............................................. H02M 5/40
[52] U.S. Cl. ......................................... 363/65; 363/69
[58] Field of Search ............................. 363/4, 5, 34–37, 363/40, 41, 65, 67–70, 95, 98

[56] References Cited

U.S. PATENT DOCUMENTS

| | | | |
|---|---|---|---|
| 3,818,307 | 6/1974 | Hamilton et al. ............... | 363/65 X |
| 4,084,220 | 4/1978 | Akamatsu ........................ | 363/65 X |
| 4,333,135 | 6/1982 | Schwarz .......................... | 363/41 X |
| 4,386,394 | 5/1983 | Kocher et al. ................... | 363/41 X |

FOREIGN PATENT DOCUMENTS

| | | | |
|---|---|---|---|
| 0127575 | 7/1983 | Japan ................................ | 363/37 |
| 59-61475 | 4/1984 | Japan . | |
| 59-194669 | 11/1984 | Japan . | |

OTHER PUBLICATIONS

IEEE Transaction on Industry Application, vol. IA–16, No. 2; pp. 222–233: Hans Kielgas, Reiner Nill; Mar.-/Apr., 1980.

Primary Examiner—Patrick R. Salce
Assistant Examiner—Emanuel Todd Voeltz
Attorney, Agent, or Firm—Oblon, Fisher, Spivak, McClelland & Maier

[57] ABSTRACT

A power converter apparatus has at least two converters CONV1 and CONV2. The DC side of each of the converters CONV1 and CONV2 is connected to a filtering capacitor Cd which serves as a DC power source for a load device LOAD. The AC side of the converter CONV1 is connected to the secondary winding of a first transformer TR1. The AC side of the converter CONV2 is connected to the secondary winding of a second transformer TR2. The primary winding of transformer TR1 is connected in series to the primary winding of transformer TR2. The series circuit of the primary windings of transformers TR1 and TR2 is coupled to an AC power supply SUP via a single AC reactor Ls. A control method of the invention is adapted to the power converter apparatus in which plural PWM converters are used. The phase of a modulating wave (carrier) of one PWM converter differs by a predetermined degree from that of another PWM converter.

13 Claims, 38 Drawing Figures

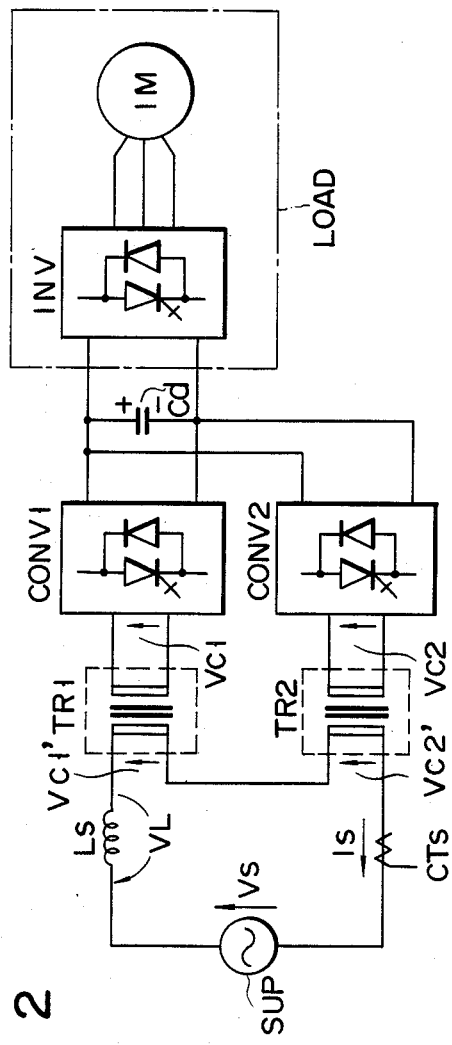
F I G. 2
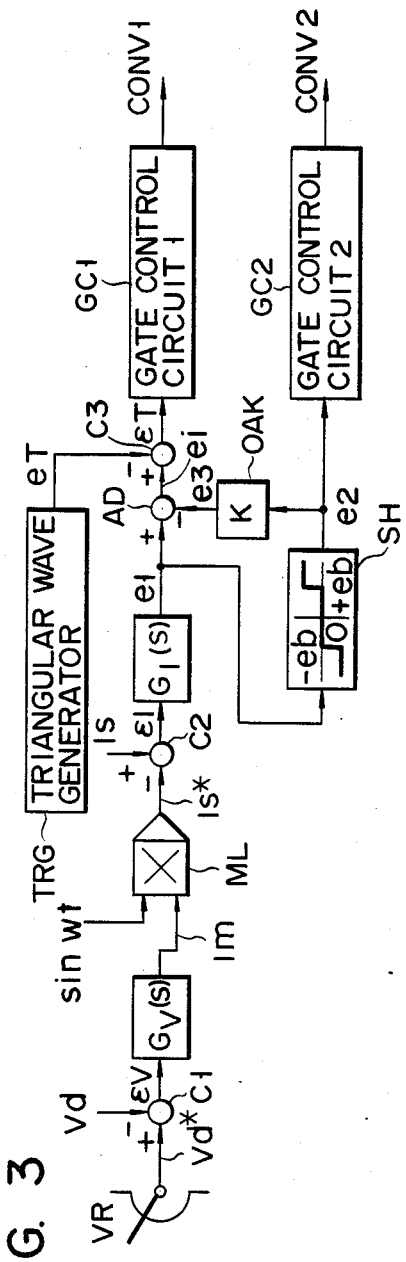
F I G. 3

$$\theta = \tan^{-1}\left(\frac{VL}{Vs}\right)$$

$VL = jwLs \cdot Is$ g1 g2

Vc1
0 g3 g4

Vc2
0

Vc1+
Vc2
0

POWER CONVERTER APPARATUS AND CONTROL METHOD THEREOF

BACKGROUND OF THE INVENTION

The present invention relates to a power converter apparatus being formed with a DC voltage source which is powered by an AC power supply, and being adapted to a load device for the DC voltage source.

The combination of a pulse-width-modulation controlled (PWM) inverter and an induction motor, the combination of a DC chopper and a DC motor, etc., are conventionally used as a load device powered by a DC voltage source. No practical problem arises where a battery is used as the DC voltage source. However, when an AD/DC power converter is used for obtaining a DC voltage from an AC power line, the AC power line is subjected to inactive power and/or higher harmonics caused by the converter operation. This is a significant problem, and has recently come to the forefront.

To solve the above problem, it is proposed that a PWM converter be used as an AC/DC power converter being arranged between an AC power line and a DC voltage souce (capacitor) (cf. Japanese Patent Disclosure No. 59-61475).

FIG. 1 shows a prior art power converter apparatus in which a large power capacity is achieved by a parallel connection of PWM converters.

In FIG. 1, the reference symbol SUP denotes a single-phase AC power supply. The reference symbol TR denotes a power transformer. The reference symbols Ls1 and Ls2 respectively denote AC reactors. The reference symbols CONV1 and CONV2 denote PWM converters. The reference symbol Cd denotes the filtering capacitor for a DC voltage source. The reference symbol INV denotes a PWM inverter which converts a DC voltage into a voltage-variable and frequency-variable, 3-phase AC voltage. The reference symbol IM denotes a 3-phase induction motor. PWM inverter INV and induction motor IM constitute a load device for DC voltage source Cd. AC reactors Ls1 and Ls2 serve to achieve the current balancing for respective converters CONV1 and CONV2, and also serve to suppress pulsate variations of input currents Is1 and Is2.

The control operation of the load device will be as follows.

The rotation speed N of induction motor IM is detected by a speed detector PG. The detected value N of the rotation speed is compared with a given speed instruction N*. Rotation speed N is controlled by a speed control circuit SPC, so that the detected speed value N becomes substantially equal to the value of speed instruction N*.

An output signal IL* from speed control circuit SPC defines the instruction value for 3-phase currents IL actually supplied to induction motor IM. The value of actual currents IL is compared with current instruction IL*. Then, currents IL are controlled by a load current control circuit ALC, so that the value of actual currents IL becomes substantially equal to the value of current instruction IL*. An inverter-side PWM control circuit PWM1 controls inverter INV in accordance with an output signal from load current control circuit ALC.

On the other hand, converters CONV1 and CONV2 control a current Is supplied from power supply SUP, so that the value of the DC voltage Vd appearing across filtering capacitor Cd becomes substantially constant. In other words, the detected value of DC voltage Vd is compared with a DC voltage instruction Vd*, and control by means of a voltage control circuit AVC is effected on current Is so that the value of voltage Vd becomes substantially equal to the value of instruction Vd*. Namely, an output signal Is* from voltage control circuit AVC defines the instruction value for current Is supplied from power supply SUP. The detected value of input current Is is compared with current instruction Is*, and current Is is controlled by an input current control circuit ASC so that the value of current Is becomes substantially equal to the value of instruction Is*. A converter-side PWM control circuit PWMc controls converters CONV1 and CONV2 in accordance with an output signal from input current control circuit ASC.

In the above prior art power converter apparatus, a current Is supplied from the AC power supply is controlled so that the value of a volage Vd appearing across DC voltage source Cd becomes substantially constant. Such a prior art apparatus has the following features:

(1) four quadrant operation, as well as regenerating operation, are both available according to the power required by the load device.

(2) The phase of input current Is is controlled to be matched with the phase of a power supply voltage Vs, so that the input power factor is kept at "1".

(3) The waveform of input current Is is controlled to be sinusoidal, so that higher harmonic components of current Is can be effectively reduced.

The above prior art power converter apparatus encounters the following disadvantages.

(1) A PWM converter performs a switching operation with a modulation frequency of several kHz. For this reason, GTOs (gate turn-off thyristors) are often required. Generally speaking, the maximum ratings of a GTO with respect to the withstanding voltage and the current capacity are lower than those of a general thyristor. From this, it is difficult to obtain a high-power converter using GTOs.

To increase the power capacity, a parallel connection of converters, as shown in FIG. 1, is conventionally employed. According to such a converter configuration, a high-power apparatus requires a large number of GTOs. This enlarges the size or dimensions of the apparatus, and increases the manufacturing cost thereof.

The prior art power converter apparatus also encounters the following disadvantages.

(2) GTOs are often used to constitute the PWM converter. Such GTOs inevitably involve ineffective operating periods, i.e., a minimum on period and a minimum off period. From this, once a turn-on signal is generated, the generation of a turn-off signal is inhibited for a period of 100 to 300 μs. Similarly, once the turn-off signal is generated, the generation of the turn-on signal is also inhibited for a period of 100 to 300 μs. Thus, the converting efficiency becomes worse as the carrier frequency of the PWM control (the switching frequency of switching elements) becomes high. This requires the reduction in the power supply voltage (secondary voltage of the transformer). If the output power capacity is fixed, the reduction in the secondary voltage of the transformer causes the increase of the input current. Then, the current capacity of the switching elements must be correspondingly increased.

Self-turn-off devices, such as GTOs, having a withstanding voltage of 4500 V and having a shut-off current of 2000 A are currently manufactured. Such highrated GTOs are used primarily to constitute high-power PWM converters. In practice, however, because of said ineffective operating periods, the possible maximum carrier frequency of the PWM control operation can be at most 500 Hz to 1 kHz.

(3) When a plurality of converters are parallel connected to enhance the power capacity, the same number of AC reactors as the number of parallel converters must be provided at the secondary circuit of the power transformer, thereby achieving the input current balancing. Respective AC reactors serve to suppress higher harmonic components involved in the AC output voltage. Such higher harmonic components are caused by the switching operation of the PWM converter. Respective AC reactors also serve to remove pulsate variations in the input current supplied from the power supply. Since, as mentioned before, the switching frequency (carrier frequency) of the respective converters is at most 500 Hz to 1 kHz, a rather large inductance is required for each converter reactor.

(4) According to the prior art apparatus, large capacity AC reactors must be provided for respective converters. From this, it is difficult to obtain a compact and light-weight apparatus. In many cases, when the space for placing a converter apparatus is limited, the prior art apparatus cannot be employed.

SUMMARY OF THE INVENTION

It is accordingly an object of the present invention to provide a power converter apparatus which allows a reduction in the required capacity of AC reactors so that a compact, light-weight and low-cost apparatus can be obtained, while ensuring the enhancement of the power capacity of the apparatus.

Another object of the present invention is to provide a control method of a power converter apparatus which allows a reduction in the capacity of AC reactors, while ensuring the enhancement in the power capacity of the apparatus.

To achieve the former object, the present invention is provided with an AC reactor; a plurality of power transformers whose primary windings are connected in series, the series connected primary windings being coupled to an AC power supply via the AC reactor; a plurality of self-excited converters respectively coupled to the secondary windings of the power transformers; a filtering capacitor commonly coupled to the DC side of the self-excited converters; and a load device being energized by DC power from the filtering capacitor.

To achieve the latter object, the method of the present invention is adapted to a plurality of PWM converters respectively connected to the secondary windings of independent plural power transformers. The primary windings of these power transformers are connected in series. The series circuit of primary windings of the transformers is coupled to an AC power supply via an AC reactor. Respective DC sides of the converters are connected in parallel to a filtering capacitor.

In such an apparatus, the same modulating frequency is applied to each of the plural PWM converters, while respective phases of the modulating waves (carrier waves) for the PWM control are different from one another. The sum of voltages appearing across respective primary windings of the power transformers involves only a little ripple, and pulsate variations of the input current become small. Then, the capacity of the AC reactor can be made small, i.e., a compact and light-weight apparatus can be obtained. Further, the switching frequency for self-extinguishable elements of the PWM converter can be lowered, thereby improving the efficiency of the converter.

BRIEF DESCRIPTION OF THE DRAWINGS

FIG. 2 shows an embodiment of a power converter apparatus according to the present invention;

FIG. 3 shows a control circuit adapted to the embodiment of FIG. 2;

DETAILED DESCRIPTION OF THE PREFERRED EMBODIMENTS

Figure 1:
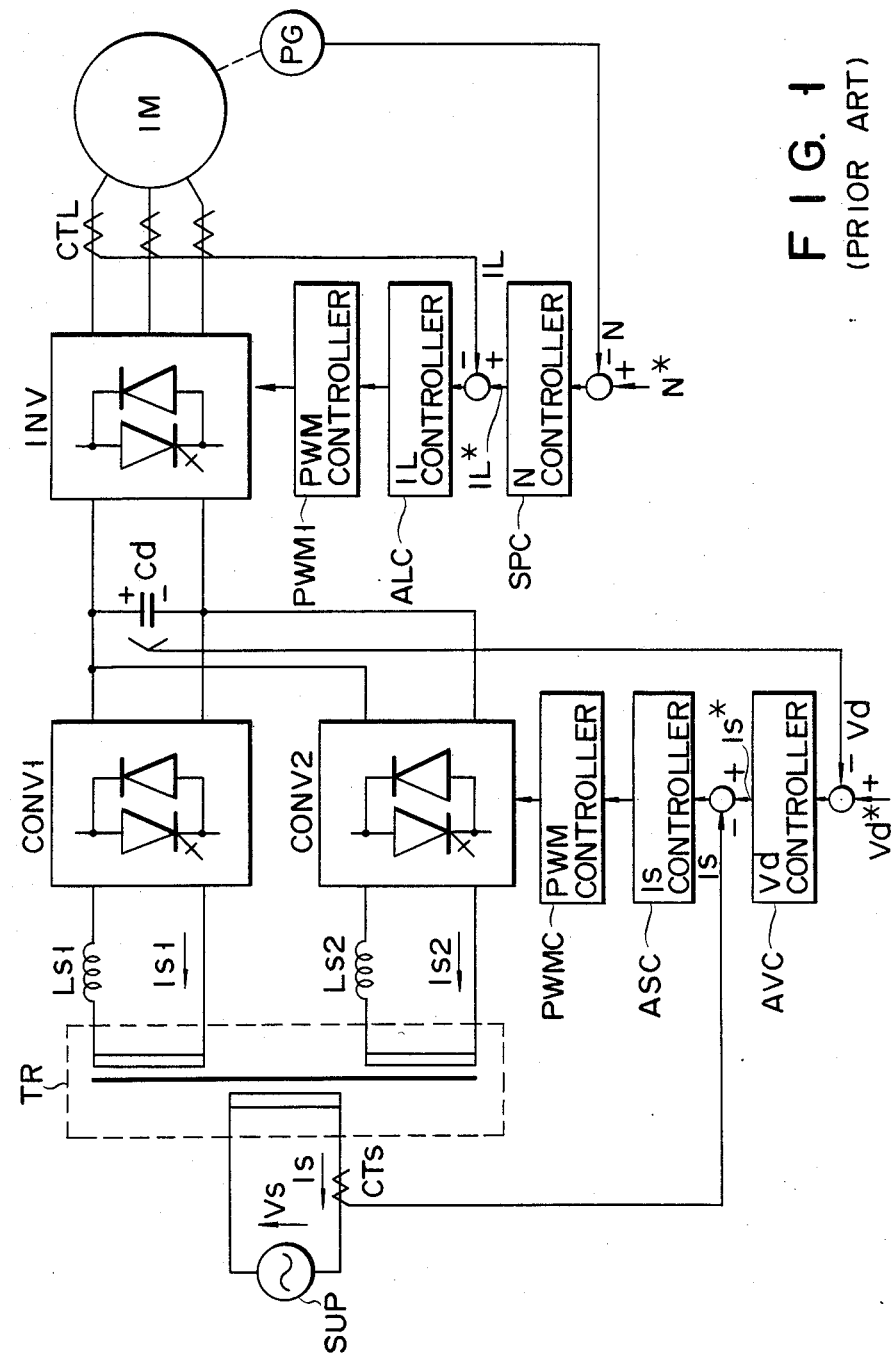
FIG. 1 shows a typical configuration of a prior art power converter apparatus.

In the following description, for the sake of simplicity, the same reference symbols are used to denote the functionally equivalent elements throughout the drawings.

FIG. 2 shows an embodiment of a power converter apparatus according to the present invention.

In FIG. 2, the reference symbol Ls denotes an AC reactor. The reference symbols TR1 and TR2 denote power transformers. The reference symbols CONV1 and CONV2 denote self-excited converters. The reference symbol Cd denotes a filtering capacitor for DC. A pulse-width-modulation controlled inverter INV and an induction motor IM are provided for a load device LOAD. Load device LOAD may be controlled by the circuit elements SPC, ALC and PWM1 shown in FIG. 1.

The DC sides of two self-excited converters CONV1 and CONV2 are parallel connected at capacitor Cd. The AC sides of converters CONV1 and CONV2 are isolated by transformers TR1 and TR2. The primary windings of transformers TR1 and TR2 are connected in series. These series connected primary windings are coupled to AC power supply SUP via AC reactor Ls.

FIG. 3 shows a control circuit adapted to the embodiment of FIG. 2. In the following, the control operation of the FIG. 2 apparatus will be described with reference to FIG. 3.

The control circuit of FIG. 3 is coupled to a current transformer CTs for detecting a power supply current Is, and includes a DC voltage setting potentiometer VR, comparators C1–C3, a voltage control compensation circuit $G_V(s)$, a multiplier ML, a current control compensation circuit $G_I(s)$, an adder AD, a level detector SH, an operational amplifier OAK, a carrier generator TRG, and gate control circuits GC1 and GC2.

A DC voltage Vd of filtering capacitor Cd is detected by the conventional manner. For instance, DC voltage Vd may be detected via an isolation amplifier (not shown). The detected voltage Vd is input to comparator C1. Comparator C1 compares the detected voltage Vd with a voltage instruction Vd* obtained from DC voltage setting potentiometer VR. Then, comparator C1 provides an error $\epsilon_V = Vd^* - Vd$. Error $\epsilon_V$ is input the voltage control compensation circuit $G_V(s)$ and is linearly amplified or integrally amplified therein. Then, a peak instruction Im for input current Is is obtained from circuit $G_V(s)$.

Peak instruction Im is input to multiplier ML. The value of instruction Im is multiplied in multiplier ML by an input sin ωt. Input sin ωt is a unit sine wave which is synchronized with a power supply voltage $Vs = Vm \cdot \sin \omega t$. Such a unit sine wave may be obtained by multiplying the detected voltage Vs by a given constant.

An output signal $Is^* = Im \cdot \sin \omega t$ from multiplier ML is used as an instruction for defining the value of current Is to be supplied from power supply SUP. Signal Is* is input to comparator C2. Comparator C2 compares instruction Is* with the detected value of power supply current Is, and provides an error $\epsilon_I = Is = Is^*$ to current control compensation circuit $G_I(s)$. In the following, it is assumed that circuit $G_I(s)$ is a conventional linear amplifier, for the sake of simplicity.

An output signal e1 from circuit $G_I(s)$ is input to adder AD. Signal e1 is also input to level detector SH. Detector SH generates a "+1" signal (e2) when the potential of input e1 exceeds a positive preset level +eb, and it generates a "−1" signal (e2) when the potential of input e1 is less than a negative preset level −eb. When the potential of input e1 falls between +eb and −eb (−eb < e1 < +eb), detector SH generates a "0" signal (e2). This signal e2 is input to gate control circuit GC2.

Gate control circuit GC2 supplies on/off signals to self-excited converter CONV2 according to signal e2 from level detector SH. Namely, an AC output voltage Vc2 of self-excited converter CONV2 may have the following values in accordance with the contents of signal e2:

$$\left.\begin{array}{l} Vc2 = +Vd \text{ for } e2 = \text{``}+1\text{''} \\ Vc2 = 0 \text{ for } e2 = 0 \\ Vc2 = -Vd \text{ for } e2 = \text{``}-1\text{''} \end{array}\right\} \quad (1)$$

When the turns ratio of the primary winding vs. the secondary winding of power transformer TR2 is 2:1, the primary voltage Vc2' of transformer TR2 becomes $2 \cdot Vc2$.

Output signal e2 from level detector SH is also input to adder AD via operational amplifier OAK. Operational amplifier OAK multiplies the value of signal e2 by a given proportional constant K, and provides an output signal $e3 = K \cdot e2$ to adder AD.

In adder AD, the phase-inverted value (−e3) of signal e3 from operational amplifier OAK is added to signal e1 from current control compensation circuit $G_I(s)$. Then, adder AD outputs a signal $ei = e1 - e3$. This signal ei is used as an input signal for pulse-width-modulation control.

Input signal ei is compared, by comparator C3, with an output signal eT (e.g., a triangular waveform with the frequency of 1 kHz) from carrier generator TRG. As the result of comparison, comparator C3 supplies an error $\epsilon_T = ei - eT$ to gate control circuit GC1. Circuit GC1 pulse-width-controls the self-excited converter CONV1 according to error $\epsilon_T$. Then, an AC output voltage Vc1 from self-excited converter CONV1 is proportional to input signal ei.

Incidentally, when the turns ratio of the primary winding vs. the secondary winding of power transformer TR1 is 1:1, the primary voltage Vc1' of transformer TR1 is equal to Vc1 (Vc1' = Vc1).

A voltage VL applied to AC reactor Ls, which is caused by power supply voltage Vs and the sum of primary voltages of two transformers TR1 and TR2, is represented as follows:

$$VL = Vs - (Vc1' + Vc2') = Vs - (Vc1 + 2 \cdot Vc2) \quad (2)$$

When input current Is flows toward the direction as indicated by an arrow in FIG. 2, it is possible to increase the amount of current Is in the arrow direction, by establishing VL > 0. When VL < 0 is established, current Is in the arrow direction decreases.

On the other hand, when input current Is flows toward the direction which is inverse to the arrow direction, it is possible to increase the amount of current Is in the inverted arrow direction, by establishing VL < 0. When VL > 0 is established, current Is in the inverted arrow direction decreases.

Figure 4A:
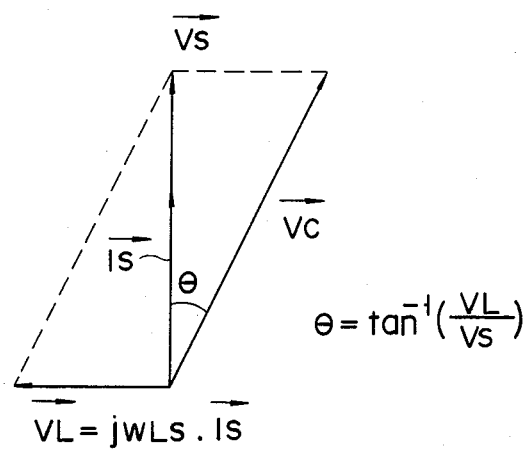
FIGS. 4A and 4B are voltage/current vector diagrams explaining the operation of the embodiment shown in FIG. 2.
Figure 4B:
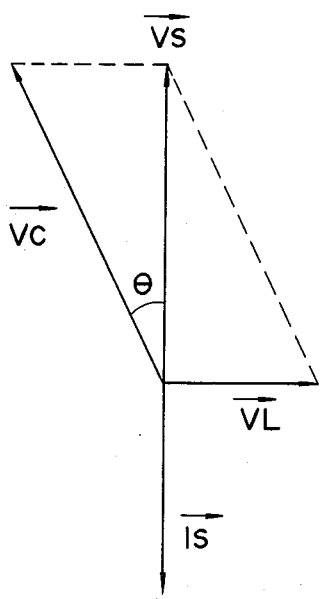

FIGS. 4A and 4B show voltage/current vector diagrams with respect to the AC side of the FIG. 2 apparatus. As will be seen from the vector diagrams, the vector of power supply voltage $\vec{Vs}$ is the vector sum of the vector of reactor voltage $\vec{VL}$ and that of a converter output voltage $\vec{Vc}$:

$$\vec{Vs} = \vec{VL} + \vec{Vc} \quad (3)$$

The vector of input current $\vec{Is}$ crosses the vector of reactor voltage $\vec{VL}$ at right angles. Thus, the following relation holds:

$$\vec{VL} = j\omega Ls \cdot \vec{Is} \quad (4)$$

where ω denotes 2πfs, i.e., it denotes the power supply frequency in radians.

Eqs. (3) and (4) teach that input current Is can be controlled by changing the sum $(Vc = Vc1' + Vc2')$ of converter output voltages so that the value of reactor voltage VL is correspondingly changed.

The vector diagram of FIG. 4A is obtained when the apparatus is operated in a power operation mode. In this mode, power is fed from AC power supply SUP to load LOAD, and the phase of reactor voltage $\vec{VL}$ advances by 90 degrees from power supply voltage $\vec{Vs}$. Accordingly, input current $\vec{Is}$ is in-phase with power supply voltage $\vec{Vs}$, thereby obtaining the power factor 1.

The vector diagram of FIG. 4B is obtained when the apparatus is operated in a regeneration mode. In this mode, power is regenerated from load LOAD to AC power supply SUP, and the phase of reactor voltage $\vec{VL}$ is delayed by 90 degrees as compared to power supply voltage $\vec{Vs}$. Accordingly, input current $\vec{Is}$ is anti-phase to power supply voltage $\overrightarrow{Vs}$, thereby also obtaining power factor 1.

The above discussion teaches that in order to obtain power factor 1, the vector of reactor voltage $\overrightarrow{VL}$ should always cross the vector of power supply voltage $\overrightarrow{Vs}$ at right angles. This right angle relation can be established by the control operation based on the vector of AC output voltage $\overrightarrow{Vc}$.

Now explanation will be given with respect to the control operation of the FIG. 3 circuit. This operation is performed in accordance with the AC output voltage $\overrightarrow{Vc}$ vector.

FIGS. 5A to 5D are timing charts explaining the control operation of the FIG. 3 circuit.

In the circuit of FIG. 3, it is assumed that the maximum value of output signal e1 from current control compensation circuit $G_I(s)$ is emax, and that the setting level eb of level detector SH is $(\frac{1}{3})$·emax.

Figure 5A:
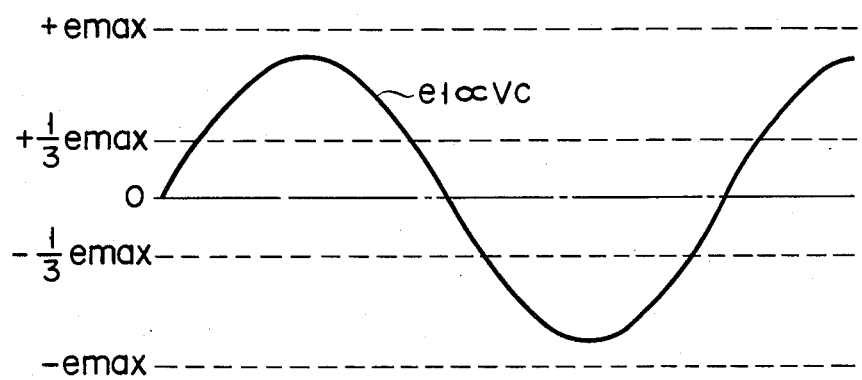
FIGS. 5A to 5D are timing charts explaining the control operation of the FIG. 3 circuit.
Figure 5B:
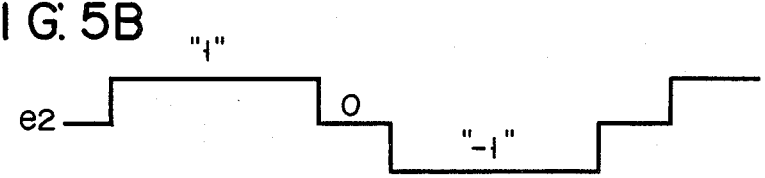

Under the above assumption, when $e1 > (\frac{1}{3})$·emax holds, the content of output signal e2 from detector SH is "+1" (FIGS. 5A and 5B). Then, the contents of output voltage Vc2 from self-excited converter CONV2 become +Vd. At this time, input signal ei for controlling PWM converter CONV1 is $ei = e1 - e3 - = e1 - K \cdot e2$. Thus, the AC side of converter CONV1 generates voltage Vc1 being proportional to the control input signal ei. Here, if proportional constant K of operational amplifier OAK is selected to be $(\frac{2}{3})$·emax, and when $e2 = +1$, the following is obtained:

$$ei = e1 - (\tfrac{2}{3}) \cdot emax \cdot e2 = e1 - (\tfrac{2}{3}) \cdot emax \tag{5}$$

Similarly, when $e1 < -(\frac{1}{3})$·emax and $e2 = $ "$-1$", $ei = e1 + (\frac{2}{3}) \cdot emax$ is obtained. When $-(\frac{1}{3}) \cdot emax \geq e1 \geq (\frac{1}{3}) \cdot emax$ and $e2 = $ "0", $ei = e1$ is obtained.

Figure 5C:
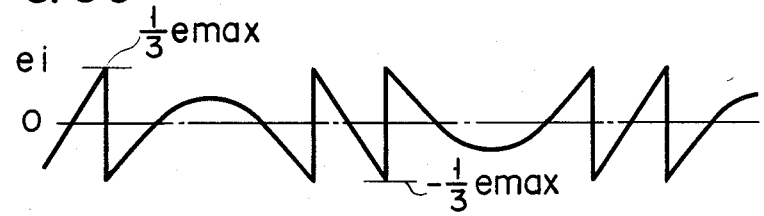
Figure 5D:
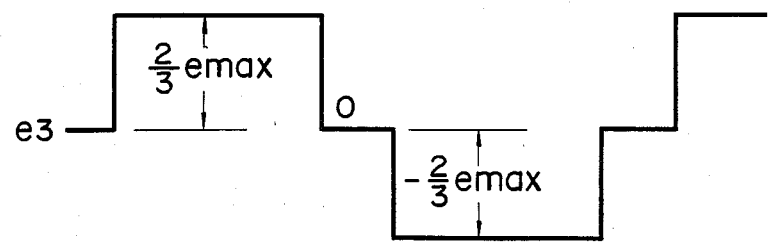

PWM converter CONV1 (FIG. 2) generates a voltage Vc1 in proportion to control input signal ei (FIG. 5C). The maximum value of voltage Vc1 is equal to the DC voltage Vd appearing across filtering capacitor Cd. From this, when $ei = (\frac{2}{3}) \cdot emax$, $Vc1 = +Vd$ is obtained. When $ei = -(\frac{1}{3}) \cdot emax$, $Vc1 = -Vd$ is obtained. If the range of potential variations of input signal ei falls between $-(\frac{1}{3}) \cdot emax$ and $(\frac{1}{3}) \cdot emax$, output voltage Vc1 from converter CONV1 varies, in proportion to ei, within the range of $-Vd$ to $+Vd$.

Output voltage Vc2 from self-excited converter CONV2 may have the following values in accordance with the contents of input signal e2: (FIG. 5B)

$$\left. \begin{array}{l} Vc2 = +Vd \text{ for } e2 = \text{``}+1\text{''} \\ Vc2 = 0 \quad \text{ for } e2 = 0 \\ Vc2 = -Vd \text{ for } e2 = \text{``}-1\text{''} \end{array} \right\} \tag{6}$$

Accordingly, converter output voltage Vc appearing at the primary side of the power transformer is:

$$\begin{aligned} Vc &= Vc1' + Vc2' = Vc1 + 2 \cdot Vc2 \\ &= \{Vd/(\tfrac{1}{3}) \cdot emax\} \cdot ei + 2 \cdot Vd \cdot e2 \end{aligned} \tag{7}$$

When a given relation $e3 = (\frac{1}{3}) \cdot emax \cdot e2$ (FIG. 5D) is substituted into the above relation, the following is obtained:

$$Vc = \{Vd/(\tfrac{1}{3}) \cdot emax\} \cdot ei + \{2Vd/(2/3) \cdot emax\} \cdot e3 \tag{8}$$

-continued
$$= (3Vd/emax)(ei + e3) = 3Vd/emax \cdot e1$$

Thus, converter output voltage Vc is proportional to output signal e1 from current control compensation circuit $G_I(s)$ (FIG. 5A).

When current instruction Is* is larger than actual current Is (Is* > Is), the potential of signal e1 goes to negative so that the value of $Vc = Vc1' + Vc2'$ becomes negative, resulting in increasing input current Is. Conversely, when Is* < Is holds, the potential of signal e1 goes to positive so that the value of $Vc = Vc1' + Vc2'$ becomes positive, resulting in decreasing input current Is. Finally, the control operation is stabilized at Is = Is*. This means that if instruction Is* is varied in a sinusoidal waveform, control is performed such that actual current Is follows the sinusoidal variation of Is*.

The control operation for DC voltage Vd may be as follows.

An output signal Is* from multiplier ML serves as an instruction for a current to be supplied from the power supply, and is represented as:

$$Is^* = Im \cdot \sin \omega t \tag{9}$$

Pulse-width-modulation control is a conventional technique. According to such a conventional technique, the pulse-width-modulation control is achieved by carrier generator TRG, comparator C3, and gate control circuits GC1 and GC2.

Carrier generator TRG generates a triangular wave eT having a frequency of approximately 1 kHz. Control input signal ei is compared with triangular wave eT in comparator C3. Comparator C3 provides error $\epsilon_T = ei - eT$. Gate turn-off thyristors (GTOs) of converters CONV1 and CONV2 receive on/off signals from gate control circuits GC1 and GC2 in accordance with error $\epsilon_T$.

When $ei > eT$, or when error $\epsilon_T$ is positive, the GTOs are on/off controlled so that AC output voltage Vc from the converter becomes +Vd. When $ei < eT$, or when error $\epsilon_T$ is negative, the GTOs are on/off controlled so that AC output voltage Vc from the converter becomes $-Vd$. Thus, output voltage Vc from the converter is controlled to be proportional to input signal ei.

In the following, how voltage Vd appearing across DC capacitor Cd is controlled will be described.

Comparator C1 compares detected DC voltage Vd with its instruction Vd*. When Vd* > Vd holds, error $\epsilon_V$ is positive. This positive error increases input current peak Im via control compensation circuit $G_V(s)$. As may be seen from Eq. (9), input current instruction Is* is a sine wave which is in-phase with the power supply voltage. From this, when actual input current Is is controlled to be Is = Is*, and if the said peak Im is positive, DC capacitor Cd receives, via converters CONV1 and CONV2, the following active power Ps from single-phase power supply SUP:

$$\begin{aligned} Ps &= Vs \times Is = Vm \cdot Im \cdot (\sin \omega t)^2 \\ &= Vm \cdot Im \cdot (1 - \cos 2\omega t)/2 \end{aligned} \tag{10}$$

where Vm denotes the amplitude (peak value) of power supply voltage Vs, Im denotes the amplitude of input current Is, and t denotes time.

Thus, energy Ps·t corresponding to $(\frac{1}{2})Cd\cdot Vd^2$ is stored in DC capacitor Cd, thereby increasing DC voltage Vd.

Conversely, when Vd*<Vd holds, error $\epsilon_V$ is negative. This negative error decreases input current peak Im via control compensation circuit $G_V(s)$, so that Im<0. Then, active power Ps becomes negative, i.e., energy Ps·t is regenerated from DC capacitor Cd to the power supply. From this, DC voltage Vd decreases so that Vd=Vd* is obtained by the control operation of the apparatus.

Figure 6:
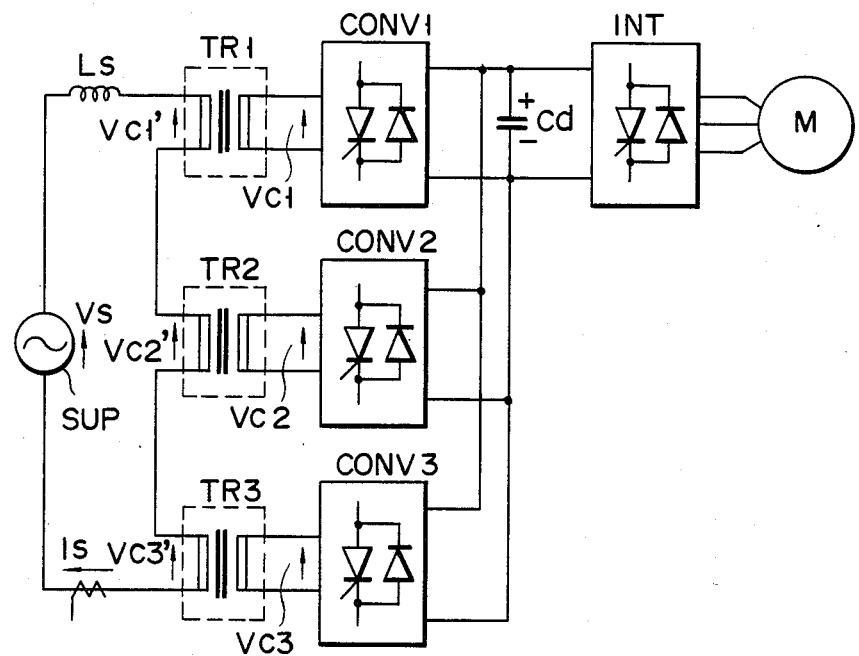
FIG. 6 shows another embodiment of a power converter apparatus according to the present invention.

FIG. 6 shows another embodiment of the present invention. This embodiment is provided with three self-excited converters CONV1 and CONV3. The AC sides of converters CONV1 and CONV3 are coupled to the secondary windings of three transformers TR1 to TR3, respectively. The primary windings of transformers TR1 and TR3 are connected in series. The series circuit of these primary windings is coupled to an AC power supply SUP via an AC reactor Ls. The DC sides of converters CONV1 to CONV3 are parallel coupled to filtering capacitor Cd. A PWM inverter for driving an induction motor M is powered by DC delivered from capacitor Cd. Converter CONV1 is controlled to achieve the pulse-width modulation. Two other converters generate rectangular waveform voltages each containing a zero-potential portion.

Figure 7:
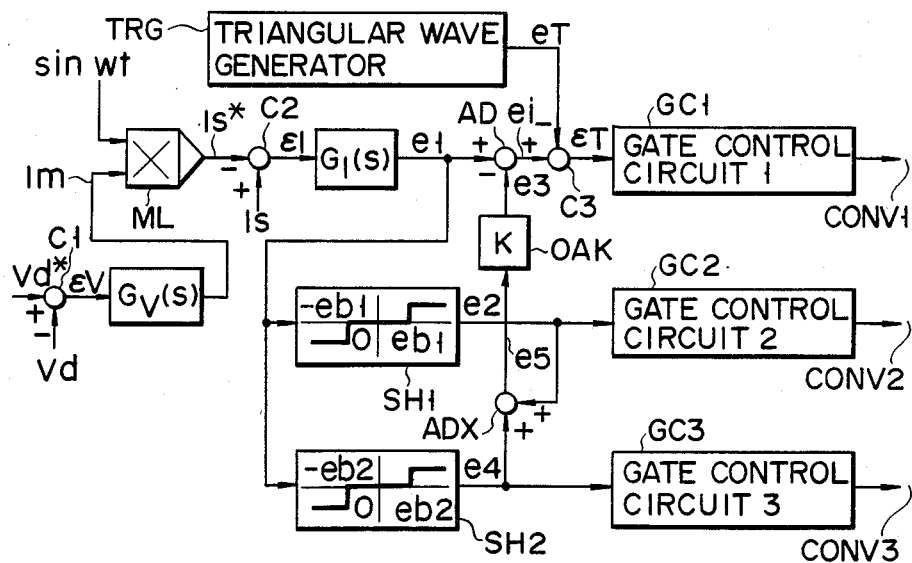
FIG. 7 shows a control circuit adapted to the embodiment of FIG. 6.

FIG. 7 shows a control circuit adapted to the embodiment of FIG. 6. This circuit is provided with two level detectors SH1 and SH2. An output signal e1 from a current control compensation circuit $G_I(s)$ is input to each of level detectors SH1 and SH2. Detector SH1 has given threshold levels ±eb1. Detector SH2 has different given threshold levels ±eb2. A signal output e2 from detector SH1 is input to a gate control circuit GC2, and also to an adder ADX. A signal output e4 from detector SH2 is input to a gate control circuit GC3, and also to adder ADX. An added signal e5 (=e2+e4) obtained from adder ADX is multiplied by a given constant K via an operational amplifier OAK. Signal e1 from compensation circuit $G_I(s)$ and the phase-inverted signal e3 (= −(e2+e4)·K) from amplifier OAK are input to an adder AD. An added signal ei(=e1=e3) from adder AD is used as a pulse-width modulation control input, and is supplied to a gate control circuit GC1 via a comparator C3. In comparator C3, signal ei modulates a triangular waveform carrier signal eT from a carrier generator TRG. Converters CONV1 to CONV3 of FIG. 6 are controlled by gate control circuits GC1 to GC3, respectively.

Assume that the turns ratio of the primary winding vs. secondary winding of transformer TR1 is selected to be 1:1, that the turns ratio of the primary winding vs. secondary winding of transformer TR2 is selected to be 2:1, and that the turns ratio of the primary winding vs. secondary winding of transformer TR3 is selected to be 2:1. Then, AC output voltage Vc of the converters, which is obtained from the series circuit of the primary windings of transformers TR1 to TR2, is:

$$Vc = Vc1' + Vc2' + Vc3' = Vc1 + 2\cdot Vc2 + 2\cdot Vc3 \tag{11}$$

where Vc1', Vc2' and Vc3' denote AC voltages appearing at respective primary windings of transformers TR1, TR2 and TR3, and Vc1, Vc2 and Vc3 denote the respective secondary voltages of these transformers.

Also, it is assumed that the maximum value of output signal e1 from a current control compensation circuit $G_I(s)$ is emax, that the preset level eb1 of level detector SH1 is (1/5)·emax, and that the preset level eb2 of level detector SH2 is (3/5)·emax.

Then, the following voltage Vc2 is generated from the AC side of self-excited converter CONV2 in accordance with input signal e2:

$$\begin{rcases} Vc2 = +Vd \text{ for } e2 = \text{``+1''} \text{ when} \\ e1 > +(1/5)\cdot emax \\ Vc2 = -Vd \text{ for } e2 = \text{``-1''} \text{ when} \\ e1 < -(1/5)\cdot emax \\ Vc2 = 0 \text{ for } e2 = 0 \text{ when } -(1/5)\cdot \\ emax \leq e1 \leq +(1/5)\cdot emax \end{rcases} \tag{12}$$

Similarly, the following voltage Vc3 is generated from the AC side of self-excited converter CONV3 in accordance with an input signal e4:

$$\begin{rcases} Vc3 = +Vd \text{ for } e4 = \text{``+1''} \text{ when} \\ e1 > +(3/5)\cdot emax \\ Vc3 = -Vd \text{ for } e4 = \text{``-1''} \text{ when} \\ e1 < -(3/5)\cdot emax \\ Vc3 = 0 \text{ for } e4 = 0 \text{ when } -(3/5)\cdot \\ emax \leq e1 \leq +(3/5)\cdot emax \end{rcases} \tag{13}$$

Control input signal ei of PWM converter CONV1 may be represented as follows:

$$ei = e1 - e3 = e1 - K\cdot(e2+e4) \tag{14}$$

where the proportional constant K is selected to be (2/5)·emax.

FIGS. 8A to 8D show timing charts illustrating the relations among signals e1, e2, e4 and ei. Input signal ei for the PWM control is regulated within a range of ±(1/5)·emax with respect to the maximum value emax of primitive input signal e1.

The total primary voltage Vc of transformers TR1 to TR3 in the apparatus of FIG. 6 is as follows:

$$Vc = Vc1' + Vc2' + Vc3' = Vc1 + 2\cdot Vc2 + 2\cdot Vc3 \tag{15}$$

$$= \{Vd/(1/5)\cdot emax\}\cdot ei + 2\cdot Vd\cdot(e2+e4)$$

$$= \{Vd/(1/5)\cdot emax\}\cdot ei + 2\cdot Vd\cdot e3/\{(2/5)\cdot emax\}$$

$$= (5Vd/emax)(ei + e3) = (5Vd/emax)\cdot e1$$

Thus, voltage Vc is proportional to the signal level of e1.

Incidentally, the control for DC voltage Vd and that for input current Is may be the same as has already been described with reference to FIGS. 2 and 3.

Although each embodiment of FIGS. 2 and 6 is directed to an apparatus for a single-phase AC power supply, the present invention may be embodied in an apparatus for a 3-phase or any other multi-phase AC power supply, of course.

Further, the configuration of FIG. 1 may be combined to that of FIG. 6. For instance, the AC sides of converters CONV2 and CONV3 of FIG. 6 may be parallel connected as shown in FIG. 1, so that the parallel primary windings of transformers TR2 and TR3 are connected in series to the primary winding of transformer TR1.

Figure 8A:
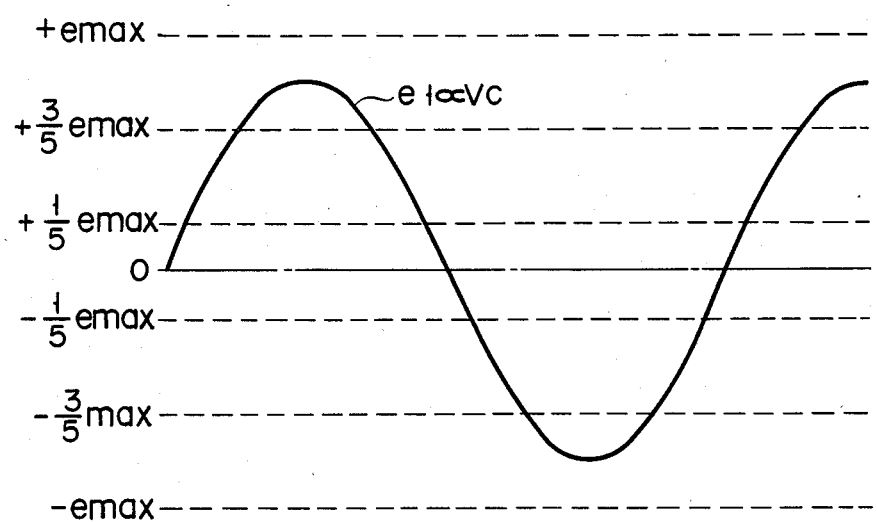
FIGS. 8A to 8D are timing charts explaining the control operation of the FIG. 7 circuit.
Figure 8B:
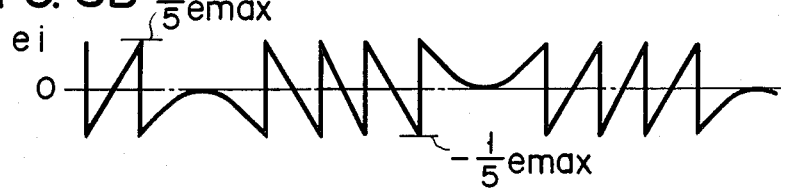
Figure 8C:
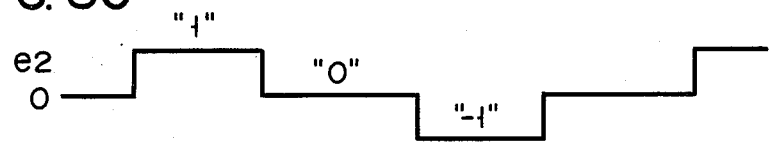
Figure 8D:
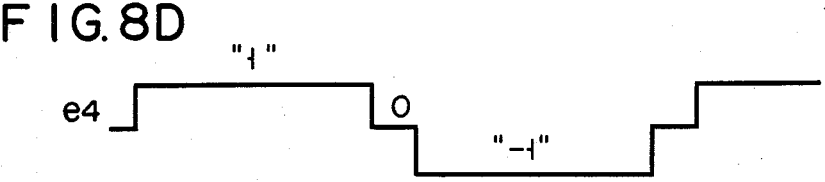

As will be understood from the above description, only one self-excited converter to be controlled in a pulse-width modulation is satisfactory to embody the present invention. In this case, each of the other self-excited converters is controlled so that within one cycle period of the power supply frequency, it generates one AC rectangular waveform voltage containing a zero potential portion, as shown in FIGS. 5B, 8C or 8D.

Though a PWM controlled self-excited converter generally requires GTOs, a conventional thyristor converter with an artificial commutation circuit, or the like device, can be employed for the other self-excited converters. From this, a large power capacity with small switching loss can be easily achieved.

In addition, according to the embodiment of the present invention, all primary windings of the transformers are connected in series, and the series circuit of the primary windings is coupled to the power supply via a single AC reactor Ls. From this, the necessary number of AC reactor Ls is only one. Further, since the sum of respective output voltages from the other self-excited converters, inclusive of the PWM converters, is used, voltage ripples can be made small, thereby achieving reduction in the capacity of AC reactor Ls.

According to the present invention, when the turns ratio of the primary winding vs. secondary winding of the power transformer adapted to the PWM converter is set at n:1, and if the turns ratios of the primary windings vs. secondary windings of the other self-excited converter transformers are set at 2n:1, the power required for the PWM converter will be ⅓ of the total power requirement of the apparatus of FIG. 1. On the other hand, according to the apparatus of FIG. 6, the power required for the PWM converter will be 1/5 of the total power required of the FIG. 1 apparatus. Thus, when one of the n self-sexcited converters is a PWM converter, the power required by the PWM converter will be $1/(2n-1)$ of the total power required.

Consequently, the share of the PWM converter (large power is difficult for PWM converters) will be small, resulting in reducing the power loss and improving the efficiency of the power converter apparatus.

Figure 9:
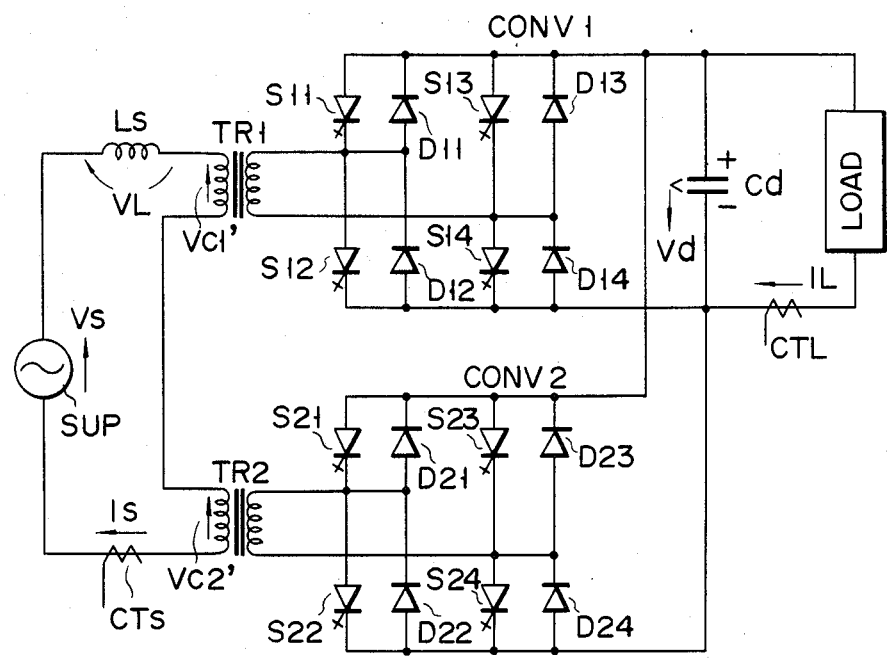
FIG. 9 shows another embodiment of a power converter apparatus according to the present invention.

FIG. 9 shows another embodiment of a power converter apparatus according to the present invention. In FIG. 9, the reference symbols CONV1 and CONV2 denote PWM converters. Respective DC sides of two PWM converters CONV1 and CONV2 are parallel connected, while the AC sides thereof are isolated by power transformers TR1 and TR2. Respective primary windings of power transformers TR1 and TR2 are series connected, and the series connection of the primary windings is coupled via AC reactor Ls to AC power supply SUP. PWM converter CONV1 is formed with self-turn-off devices, such as GTOs, S11–S14 and wheeling diodes D11–D14. PWM converter CONV2 may have the same configuration as CONV1.

Figure 10:
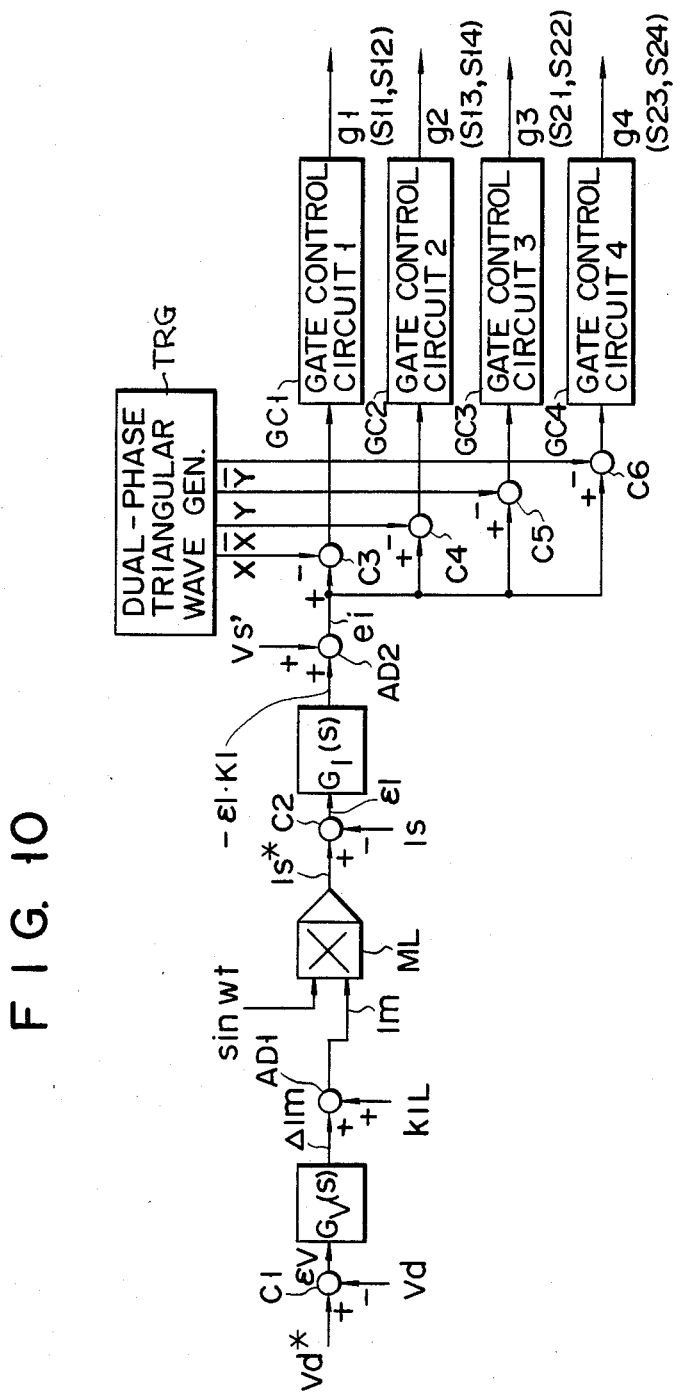
FIG. 10 shows a control circuit adapted to the embodiment of FIG. 9.

FIG. 10 shows a control circuit used for the apparatus of FIG. 9. In FIG. 10, the reference symbols C1–C6 denote comparators. The reference symbol $G_V(s)$ denotes a voltage control compensation circuit. The reference symbols AD1 and AD2 denote adders. The reference symbol ML denotes a multiplier. The reference symbol $G_I(s)$ denotes a current control compensation circuit. The reference symbol TRG denotes a polyphase triangular waveform carrier generator. The reference symbols GC1–GC4 denote gate circuits.

In the following, the control operation of PWM converters CONV1 and CONV2 will be described with reference to FIGS. 9 and 10.

A DC voltage Vd appearing across filtering capacitor Cd is detected and input to comparator C1. Comparator C1 compares the value of detected voltage Vd with a DC voltage instruction Vd*, and provides an error $\epsilon_V = Vd^* - Vd$. Error $\epsilon_V$ is input to voltage control compensation circuit $G_V(s)$ and is linearly amplified or integrally amplified therein. Then, a part ($\Delta Im$) of peak instruction Im for input current Is is obtained from circuit $G_V(s)$.

Meanwhile a load current IL is detected by a current transformer CTL, and the detected current IL is multiplied by a constant k. The multiplied current value $k \cdot IL$ is added by adder AD1 to an output signal $\Delta Im$ from circuit $G_V(s)$. Then, the following peak instruction Im for input current Is is obtained from adder AD1:

$$Im = k \cdot IL + \Delta Im \quad (16)$$

The obtained peak instruction Im is input to multiplier ML. Multiplier ML also receives an input signal sin ωt. Signal sin ωt is a unit sine wave which is synchronized with power supply voltage $Vs = Vm \cdot \sin \omega t$. (Vm is the amplitude of sine wave voltage Vs.) Signal sin ωt can be obtained by multiplying the value of voltage Vs by a given constant (1/Vm).

The output signal $Is^* = Im \cdot \sin \omega t$ from multiplier ML serves as an instruction for a current Is to be supplied from AC power supply SUP. Instruction Is* is input to comparator C2. Comparator C2 compares the value of detected current Is with instruction Is*, and sends an error $\epsilon_1 = Is^* - Is$ to current control compensation circuit $G_I(s)$. The characteristic of control compensation circuit $G_I(s)$ is determined in consideration of the characteristic of a transient response and/or the stability of the circuit's operation. In many cases, a linear and/or integration element is conventionally used for circuit $G_I(s)$. In the following description, it is assumed that only a linear element is used for circuit $G_I(s)$, provided that circuit $G_I(s)$ is formed of an inverting amplifier with an amplification factor of $-KI$. This condition is often sufficient to achieve stable control operation.

An output signal from control compensation circuit $G_I(s)$ is input to an adder AD2. In adder AD2, the output signal is added to a compensation amount Vs' corresponding to power supply voltage Vs. Thus, PWM control input signal ei may be represented as follows:

$$ei = \epsilon_1 \cdot KI + Vs' = -(Is^* - Is) \cdot KI + Vs' \quad (17)$$

Input signal ei is input to each of the comparators C3, C4, C5 and C6. In these comparators, signal ei is compared with each of the PWM control carrier wave signals X, $\overline{X}$, Y and $\overline{Y}$. A triangular wave signal with a frequency of about 500 Hz may be used for signal X. Signal $\overline{X}$ is obtained by phase-inverting signal X. Signal Y is obtained by delaying the phase of signal X by 90 degrees. Signal $\overline{Y}$ is obtained by phase-inverting signal Y.

FIGS. 11A to 11H are timing charts explaining the control operation of the FIG. 10 circuit.

Figure 11A:
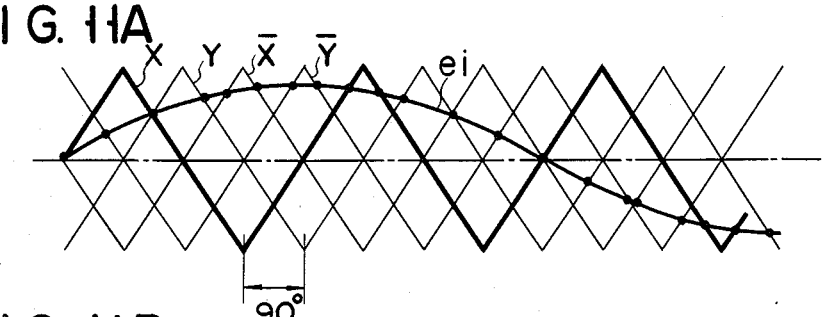
FIGS. 11A to 11H are timing charts explaining the control operation of the FIG. 10 circuit.
Figure 11B:

Input signal ei is compared with triangular wave X so as to generate a gate signal g1 (cf. FIGS. 11A and 11B). Namely, when the potential of ei exceeds the potential of X(ei > X), the logic level of g1 goes to "1" (g1 = 1), so that element S11 is turned on while element S12 is turned off. When the potential of ei is equal to or less than the potential of X(ei ≦ X), the logic level of g1 goes to "0" (g1 = 0), so that element S12 is turned on while element S11 is turned off.

Figure 11C:

Similarly, input signal ei is compared with triangular wave $\overline{X}$ so as to generate a gate signal g2 (cf. FIGS. 11A and 11C). Namely, when the potential of ei exceeds the potential of $\overline{X}$ (ei>$\overline{X}$), the logic level of g2 goes to "1" (g2=1), so that element S14 is turned on while element S13 is turned off. When the potential of ei is equal to or less than the potential of $\overline{X}$ (ei≦$\overline{X}$), the logic level of g2 goes to "0" (g2=0), so that element S13 is turned on while element S14 is turned off.

In the apparatus of FIG. 9, a voltage Vc1 appearing at the AC side of converter CONV1 has the following values in accordance with the on/off states of elements S11 to S14:

$$\left. \begin{array}{l} Vc1 = +Vd \text{ for } S11 = \text{on}, S14 = \text{on} \\ Vc1 = -Vd \text{ for } S12 = \text{on}, S13 = \text{on} \\ Vc1 = 0 \text{ for any on/off state of elements } S11 \text{ to} \\ \quad S14 \text{ other than the above} \end{array} \right\} \quad (18)$$

Figure 11D:

Thus, when gate signals g1 and g2 are given, voltage Vc1 generated at the AC side of converter CONV1 has the waveform shown in FIG. 11D.

Figure 11E:
Figure 11F:
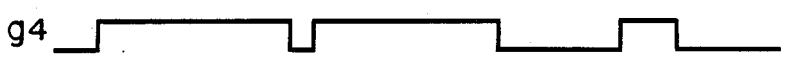
Figure 11G:
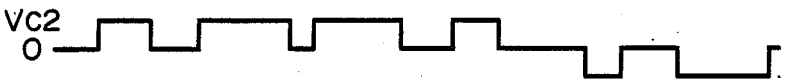

In a similar manner, input signal ei is compared with each of the triangular waves Y and $\overline{Y}$ so as to generate gate signals g3 and g4 (cf. FIGS. 11A, 11E and 11F). Then, elements S21 to S24 of converter CONV2 are triggered so that a voltage Vc2 generated at the AC side of converter CONV2 has the waveform shown in FIG. 11G.

Figure 11H:

When two voltages Vc1 and Vc2 generated at the respective AC sides of converters CONV1 and CONV2 are added to each other, a voltage sum Vc1+Vc2 having the waveform shown in FIG. 11H is obtained.

In FIG. 11H, the average of voltage sum Vc1+Vc2 is shown by a broken line, and has a potential proportional to the PWM control input signal ei.

As has been mentioned with reference to FIGS. 4A and 4B, input current vector $\vec{Is}$ can be controlled by adjusting the magnitude of reactor voltage vector $\vec{VL}$. Such a magnitude adjustment of vector $\vec{VL}$ can be achieved by adjusting the magnitude of voltage sum $Vc1+Vc2$ (=Vc).

In the above current vector control, power supply voltage vector $\vec{VS}$ could be a disturbance factor. To remove the influence of such a disturbance, compensation amount Vs', which is anti-phasic to power supply voltage Vs and has a magnitude corresponding to Vs, is used to obtain PWM control input signal ei in the circuit of FIG. 10.

In the following, the control operation of input current Is will be described.

When actual current Is is less than its instruction Is*(Is*>Is), error $\epsilon_I=Is^*-Is$ becomes positive. Then, the output ($-\epsilon_I\cdot KI$) from control compensation element $G_I(s)$ becomes negative, so that the value of PWM control input signal ei decreases. Since converter output voltage $Vc=Vc1+Vc2$ is proportional to the voltage of input signal ei, the following relation is established:

$$Vc=Kc\cdot ei=Kc\cdot(-\epsilon_I\cdot KI+Vs') \quad (19)$$

where Kc denotes a converting coefficient of the converter. Since the control is performed so that $Kc\cdot Vs'=Vs$, the above relation may be modified as follows:

$$Vc=-\epsilon_I\cdot KI\cdot Kc+Vs \quad (20)$$

Thus, the relation $VL=\epsilon_I\cdot KI\cdot Kc$ is established (cf. FIG. 4A or 4B). Then, reactor voltage VL is increased correspondingly to the increase of error $\epsilon_I=Is^*-Is$, so that input current Is increases. Finally, the control achieves the target relation Is≃Is*.

Conversely, when actual current Is is larger than instruction Is*(Is*<Is), error $\epsilon_I=Is^*-Is$ becomes negative. Then, reactor voltage VL becomes negative, so that the value of input current Is decreases. Eventually, the control also achieves the target relation Is≃Is*.

When input current instruction Is* is represented by Im·sin ωt, actual current Is is controlled such as to follow Is* so that Is becomes sinusoidal.

In the following, the control operation of DC voltage Vd will be described.

When detected voltage Vd is less than DC voltage instruction Vd*(Vd*>Vd), error $\epsilon_V=Vd^*-Vd$ becomes positive. Then, the output (ΔIm) from control compensation circuit $G_V(s)$ is increased so that the value of peak instruction Im for input current Is increases. From this, active power $Pi=Vs\cdot Is$ delivered from AC power supply SUP increases, and energy ($\frac{1}{2}$)Cd·Vd² stored in filtering capacitor Cd correspondingly increases. Thus, the following relation holds:

$$Pi\cdot t=(\tfrac{1}{2})Cd\cdot Vd^2 \quad (21)$$

where t denotes time.

Accordingly, DC voltage Vd is increased with the increase of active power Pi, so that the control achieves the relation Vd≃Vd*.

Conversely, when detected voltage Vd is larger than DC voltage instruction Vd*(Vd*<Vd), error $\epsilon_V=Vd^*-Vd$ becomes negative. Then, the value of peak instruction Im decreases, and active power Pi from AC power supply SUP also decreases so that the energy stored in filtering capacitor Cd is reduced. Eventually, the relation Vd≃Vd* is achieved by the control operation.

Rapid changes of the load cause variations in DC voltage Vd. To prevent large variations in DC voltage Vd caused by rapid load changes, a value kIL proportional to load current IL is supplied to adder AD1 in FIG. 10. Thus, peak instruction Im for input current Is is given in accordance with the value of load current IL.

The active power $Pi=Vs\cdot Is$ supplied from AC power supply SUP may be represented as $Pi=(Vm\cdot Im)/2$, while active power Po supplied to the load may be represented as $Po=Vd\cdot IL$.

Assume that the power loss of the converter is negligibly small. Then, Pi=Po is obtained and the following holds:

$$(Vm\cdot Im)/2=Vd\cdot IL. \quad (22)$$

Where the proportional constant k of said value kIL may be so determined as to maintain the above relation.

The circuit of FIG. 10 may be modified for the apparatus of FIG. 6. In this modified circuit, a 6-output polyphase triangular waveform generator is used for carrier generator TRG, and six gate control circuits (GC1 to GC6) with six comparators are provided.

The control operation of DC voltage Vd and that of input current Is performed in the modified circuit of FIG. 10 are substantially the same as the control operation of the FIG. 7 circuit.

FIGS. 12A to 12K are timing charts explaining the control operation of the above modified circuit of FIG. 10. In the following, the PWM control operation of the modified circuit of FIG. 10 will be described with reference to FIGS. 12A to 12K.

Figure 12A:
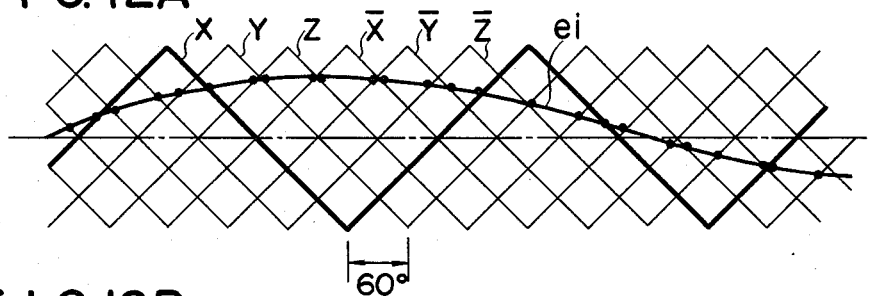
FIGS. 12A to 12K are timing charts explaining the control operation of a modification of the FIG. 10 circuit.
Figure 12B:
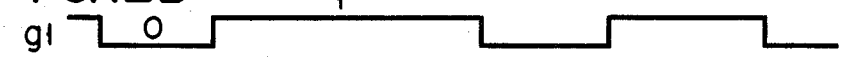
Figure 12C:

Signals X, Y, Z, $\overline{X}$, $\overline{Y}$ and $\overline{Z}$ shown in FIG. 12A are carrier waves used for the PWM control. Signals $\overline{X}$, $\overline{Y}$ and $\overline{Z}$ are obtained by inverting the respective phases of signals X, Y and Z. Signal ei (FIG. 12A) is an input signal for PWM control.

Assume that converter CONV1 is formed with four self-turn-off devices (e.g., GTOs) S11–S14 and four wheeling diodes D11–D14, as shown in FIG. 9. In this case, signal g1 in FIG. 12B controls the on/off operations of elements S11 and S12. Signal g2 in FIG. 12C controls the on/off operations of elements S13 and S14.

Input signal ei is compared with carrier wave X. When ei>X holds, g1="1" is obtained so that element S11 is turned on while element S12 is turned off. When ei≦X holds, g1="0" is obtained so that element S11 is turned off while element S12 is turned on. On the other hand, input signal ei is also compared with carrier wave $\overline{X}$. When ei>$\overline{X}$ holds, g2="1" is obtained so that element S13 is turned off while element S14 is turned on. When ei≦$\overline{X}$ holds, g2="0" is obtained so that element S13 is turned on while element S14 is turned off.

Figure 12D:

According to the result of the above comparing operation, voltage Vc1 generated at the AC side of converter CONV1 has a waveform as shown in FIG. 12D. Namely, voltage Vc1 has a waveform controlled with a frequency which is double that of the carrier frequency.

Figure 12E:
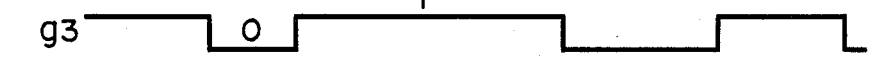
Figure 12F:
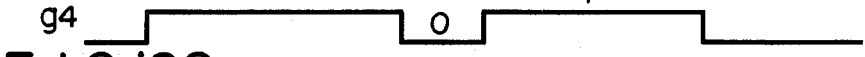
Figure 12G:

In a similar manner, input signal ei is compared with each of carrier waves Y and $\overline{Y}$ so as to generate signals g3 and g4 (FIGS. 12E and 12F). Converter CONV2 (FIG. 6) is controlled in accordance with the generated signals g3 and g4. At this time, the frequency of carrier wave Y is the same as that of carrier wave X, while a phase difference of 60 degrees exists between carrier waves Y and X. According to the result of the above comparing operation, voltage Vc2 generated at the AC side of converter CONV2 has a waveform as shown in FIG. 12G. Namely, voltage Vc2 also has a waveform controlled with a frequency which is double that of the carrier frequency.

Figure 12H:
Figure 12I:
Figure 12J:

Further, input signal ei is compared with each of the carrier waves Z and $\overline{Z}$ so as to generate signals g5 and g6 (FIGS. 12H and 12I). Converter CONV3 (FIG. 6) is controlled in accordance with the generated signals g5 and g6. At this time, the frequency of carrier wave Z is the same as that of carrier wave X, while a phase difference of 120 (=60×2) degrees exists between carrier waves Z and X. According to the result of the above comparing operation, voltage Vc3 generated at the AC side of converter CONV3 has a waveform as shown in FIG. 12J. Namely, voltage Vc3 also has a waveform controlled with a frequency which is double that of the carrier frequency.

Figure 12K:

Input current Is is controlled in accordance with a voltage sum $Vc=Vc1+Vc2+Vc3$ of the outputs from the three converters. The waveform of voltage sum Vc is shown in FIG. 12K. As will be seen from the illustration of FIG. 12K, the control frequency of Vc is 6 times higher than the carrier frequency.

A voltage difference $VL=Vs-Vc$ between power supply voltage Vs and converter output voltage Vc is applied to AC reactor Ls. A ripple component ΔIs of input current Is obtained in this case may be defined as follows:

$$\Delta Is = (1/Ls) \cdot (\Delta VL) \cdot (\Delta T) \quad (23)$$

where Ls denotes the inductance of AC reactor Ls, and ΔVL denotes the pulsate component of reactor voltage VL, the magnitude of ΔVL being ½ of the DC voltage Vd. Here, time ΔT depends on the control frequency 6fc (fc is the carrier frequency) of converter output voltage Vc and on the duty cycle of PWM control. If the duty cycle is assumed to be 50%, ΔT may be represented as follows:

$$\Delta T = (\tfrac{1}{2})(1/6fc) = 1/fc \quad (24)$$

In this case, ripple component ΔIs is:

$$\Delta Is = (1/Ls)(Vd/2)(1/12fc) \quad (25)$$

The above Eq. (25) teaches that the magnitude of ripple components ΔIs of input current Is, which is obtained by controlling the respective phase-staggered carrier waves of three series-connected PWM converters, can be reduced to ⅓ of the input current ripple involved in a conventional apparatus.

In other words, if the magnitude of input current ripple component ΔIs may be the same as that involved in a conventional apparatus, the capacity (inductance) of AC reactor Ls may be ⅓ of that of an AC reactor required in the conventional apparatus.

In addition, since the control frequency for converter output voltage Vc is increased corresponding to the number of series-connected converters, the gain of the control system for input current Is can be made high, thereby improving the response of control.

When four PWM converters are connected in series, eight carrier wave signals having the same frequency are provided. In this case, respective carrier wave signals have the phase difference of 45 degrees (=360/8) between them.

When n PWM converters are connected in series, 2n carrier wave signals having the same frequency are provided. In this case, respective carrier wave signals have the phase difference of 360/2n degrees between them.

Incidentally, although a single-phase power supply is used in the embodiment of FIG. 9, 3-phase or any other polyphase power supply may be similarly used to embody the present invention.

Figure 13:
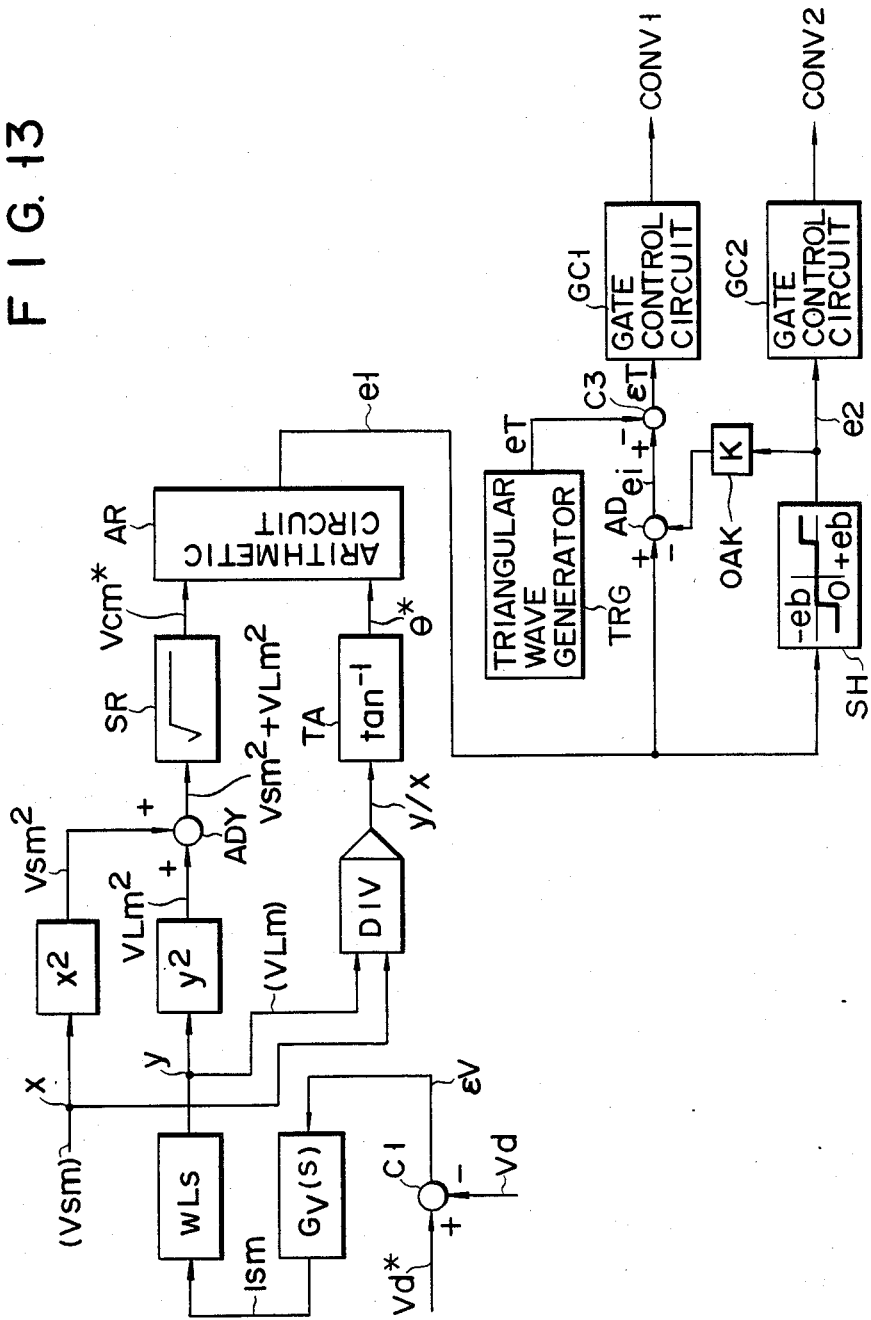
FIG. 13 shows another control circuit which may be adapted to the embodiment of FIG. 2, 6 or 9.

FIG. 13 shows another control circuit which may be adapted to the embodiment of FIGS. 2, 6 or 9. An error $\epsilon v(=Vd^*-Vd)$ from comparator C1 is changed to a current peak instruction Ism via voltage control compensation circuit Gv(s). Instruction Ism defines the amplitude of power supply current $Is(=Ism \sin \omega t)$. Instruction Ism is converted into a voltage instruction $VLm(=j\omega Ls \cdot Ism)$ via a converting circuit ωLs. Instruction VLm corresponds to voltage VL applied to AC reactor Ls shown in FIGS. 2, 6 or 9. Instruction VLm is supplied as an input y to a squaring circuit y², and to a divider DIV.

Divider DIV receives another input x. Input x is a voltage peak instruction Vsm which defines the amplitude of power supply voltage $Vs(=Vsm \sin \omega t)$. The phase of voltage vector $\overrightarrow{Vs}$ differs by 90 degrees from the phase of voltage vector $\overrightarrow{VL}$, as shown in FIG. 4A or 4B. Divider DIV supplies an arc tangent circuit TA with a divided signal y/x which represents VLm/Vsm.

Circuit TA converts signal $y/x(=VLm/Vsm)$ into a phase angle instruction $\theta^* = \tan^{-1}(VLm/Vsm)$.

Input $x(=Vsm)$ is supplied to a squaring circuit $x^2$. Squaring circuit $x^2$ supplies a squared signal $Vsm^2$ to an adder ADY. Squaring circuit $y^2$ supplies a squared signal $VLm^2$ to adder ADY. Adder ADY provides a sum signal $Vsm^2 + VLm^2$ to a square root circuit SR. Then, circuit SR generates a voltage amplitude instruction $Vcm^* = [Vsm^2 + VLm^2]^{\frac{1}{2}}$ Voltage amplitude instruction $Vcm^*$ and phase angle instruction $\theta^*$ are supplied to an arithmetic circuit AR in which the following arithmetic calculation is performed:

$$e1 = Vcm^* \sin(\omega t - \theta^*) \quad (26)$$

Signal e1 is thus obtained from circuit AR, and is supplied to adder AD (FIG. 3) or to adder AD2 (FIG. 10).

Figure 14:
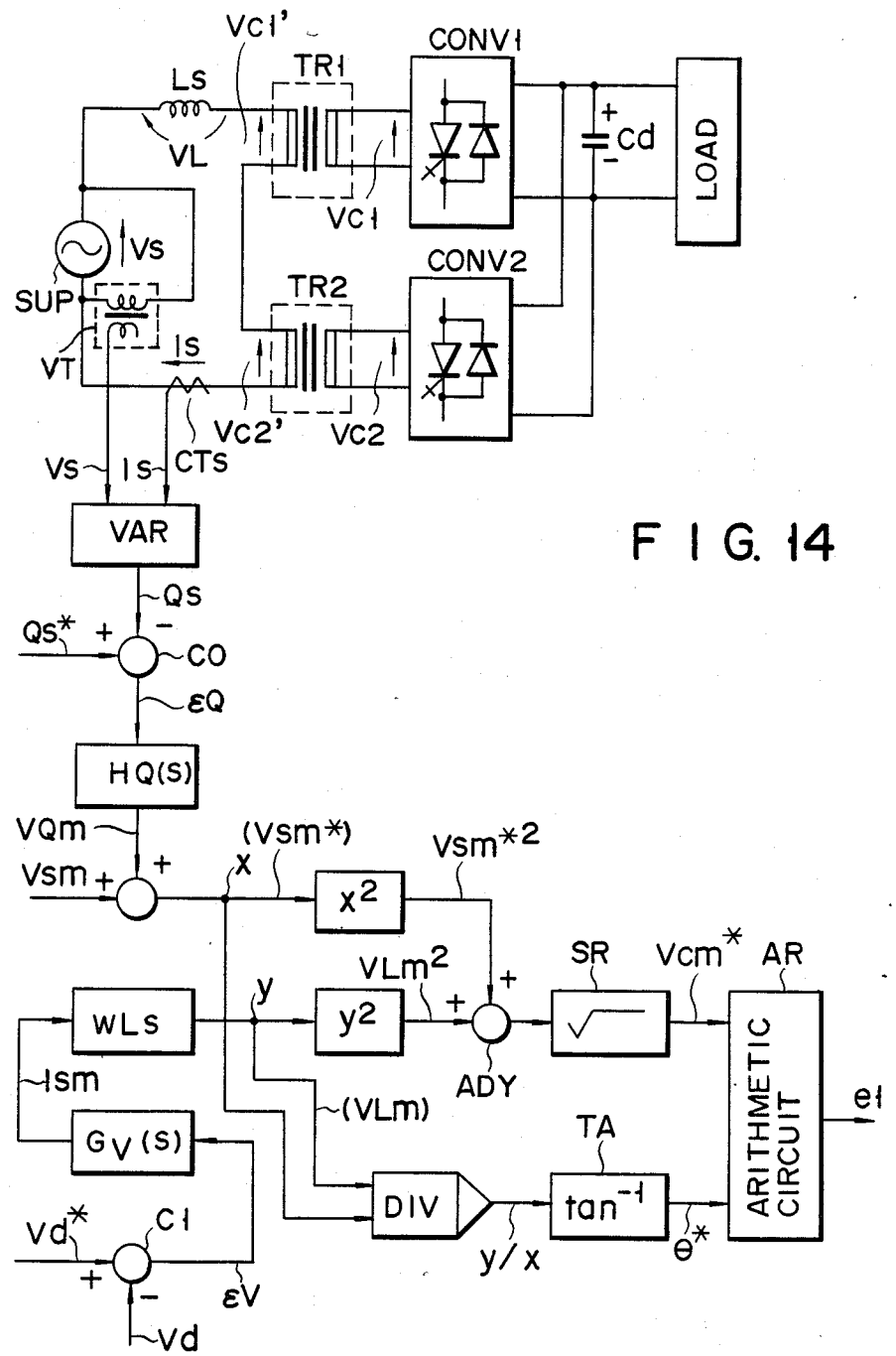
FIG. 14 shows still another control circuit which may be adapted to the embodiment of FIG. 2, 6 or 9.

FIG. 14 shows a modification of the FIG. 13 circuit. In the FIG. 13 circuit, since voltage vector $\vec{Vs}$ is not in-phase (or anti-phase) with current vector $\vec{Is}$, the power factor 1 cannot be obtained. However, the FIG. 14 circuit can achieve the power factor 1 according to the following circuit arrangement.

Power supply voltage Vs is detected via a voltage transformer VTs. Power supply current (AC input current) Is is detected via a current transformer CTs. The detected values of voltage Vs and current Is are input to a reactive power arithmetic circuit VAR. In circuit VAR, a 90-degree phase-shifted voltage signal Vs′ (not shown) is composed from Vs, and composed signal Vs′ is multiplied by Is. Such a reactive power arithmetic circuit is well known to a person skilled in the art. Circuit VAR generates a reactive power signal $Qs(=Vs' \cdot Is)$. The generated reactive power signal Qs is compared in a comparator C0 with a given reactive power instruction Qs*. Comparator C0 supplies a control compensation circuit HQ(s) with an error $\epsilon_Q = Qs^* - Qs$. Compensation circuit HQ(s) may be formed of a linear and/or integration circuit, and supplies to an adder ADZ a voltage signal VQm corresponding to error $\epsilon_Q$. Adder ADZ also receives voltage peak instruction Vsm, and generates a compensated voltage peak instruction $Vsm^*(=Vsm + VQm)$. This instruction Vsm* corresponds to the input x in the FIG. 13 circuit.

Other circuit configurations of FIG. 14 are the same as those of FIG. 13.

It will be understood from the above description, according to the power converter apparatus of the present invention, the following advantages can be obtained:

(1) It is possible to control the waveform of input current Is from a power supply to a sinusoidal waveform, and to control the phase of input current Is to be in-phase with the phase of power supply voltage Vs. From this, the input power factor can be fixed always at 1, and higher harmonic components involved in input current Is can be made very small.

(2) It is possible to convert AC power to DC power with constant voltage Vd. Thus, a stable DC power supply for a load can be ensured. In addition, the control operation is highly responsive to rapid changes in the magnitude of the load. Also, power regenerating can be performed.

(3) It is possible to lower the switching frequency of self-turn-off devices constituting a PWM converter. This ensures reduction of the power loss of a snubber circuit and/or the switching loss of self-turn-off devices, resulting in enhancing the operation efficiency of the converter.

(4) The lowered switching frequency of elements serves to minimize the on/off time of GTOs, etc., thereby heightening the effectiveness of the converters. This allows reduction in the required power of transformers and/or converters.

(5) The control frequency of PWM converters becomes high as the number of the series-connected converters becomes large. High control frequency improves the response of input current control.

(6) Ripple components of the input current can be made small, thereby reducing higher harmonics of the input current.

(7) The increased control frequency for the PWM converter output voltage permits the reduction in the capacity of AC reactors, thereby achieving a compactness of the apparatus.

What is claimed is:

1. A power converter apparatus comprising:
   an AC reactor;
   a plurality of power transformers whose primary windings are connected in series, the series connected primary windings being coupled to an AC power supply via said AC reactor;
   a plurality of self-excited converters, having AC sides respectively coupled to the secondary windings of said power transformers, and having DC sides; and
   a filtering capacitor, coupled to each DC side of said self-excited converters, for providing DC power for energizing a load of the power converter apparatus.

2. A power converter apparatus according to claim 1, wherein one converter of said plurality of self-excited converters is provided with:
   first means for generating a rectangular waveform AC voltage having a zero potential portion within one cycle period of said AC power supply, and determining a voltage appearing at the AC side of said one self-excited converter in accordance with said rectangular waveform AC voltage.

3. A power converter apparatus according to claim 2, wherein another converter of said plurality of self-excited converters is provided with:
   second means, coupled to said first means, for generating a control signal having a waveform corresponding to the difference between the waveform of an AC voltage of said AC power supply and the waveform of said rectangular waveform AC voltage, and determining a voltage appearing across the series connected primary windings of said plural power transformers in accordance with said control signal.

4. A power converter apparatus according to claim 3, wherein said another converter is a pulse-width-modulation controlled converter.

5. A power converter apparatus according to claim 2, wherein the turns ratio of the primary winding vs. secondary winding of the power transformer coupled to said one self-excited converter is 2n:1, while the turns ratio of the primary winding vs. secondary winding of the power transformer coupled to another one self-excited converter is n:1.

6. A power converter apparatus according to claim 5, wherein another one of said plurality of self-excited converters is a pulse-width-modulation controlled converter.

7. A power converter apparatus according to claim 3, wherein said second means includes:
control means, responsive to a DC voltage appearing across said filtering capacitor and responsive to an AC current flowing through the series connected primary windings of said plural power transformers, for controlling said AC current in accordance with a given current instruction so that said DC voltage is kept at a prescribed value.

8. A power converter apparatus according to claim 7, wherein said control means includes:
means for adjusting the phase of said AC current so that said AC current is in-phase or anti-phase with a voltage of said AC power supply.

9. A power converter apparatus according to claim 1, wherein said plural self-excited converters are plural pulse-width-modulation controlled converters.

10. A control method for the power converter apparatus of claim 9, comprising the steps of:
setting, at a given frequency, each frequency of modulated waves delivered from said plural pulse-width-modulation controlled converters;
shifting, by a given degree, the phase of one of said modulated waves from that of another of said modulated waves, such that the amount of the phase shifting degrees corresponds to the number of said pulse-width-modulation controlled converters; and
effecting, on each of said pulse-width-modulation controlled converters, a pulse-width-modulation in accordance with said modulated waves.

11. A control method according to claim 10, wherein each of n sets of said pulse-width-modulation controlled converters has bridge-connected switching elements in a single phase fashion, and wherein 2n sets of triangular wave signals are respectively supplied as modulating signals to said n pulse-width-modulation controlled converters, the frequencies of said triangular wave signals being the same, and the phase difference between adjacent signals of said triangular wave signals being selected to be 180/n degrees.

12. A control method according to claim 10, wherein a current flowing through said AC reactor is changed by said plural pulse-width-modulation controlled converters, so that a DC voltage appearing across said filtering capacitor is substantially kept at a constant value.

13. A control method according to claim 12, wherein said pulse-width-modulation is effected so that the waveform of said AC reactor current becomes sinusoidal and the phase of this sinusoidal AC reactor current is in-phase or anti-phase with a voltage of said AC power supply.

* * * * *